(12) United States Patent
Guo

(10) Patent No.: US 6,339,833 B1
(45) Date of Patent: Jan. 15, 2002

(54) AUTOMATIC RECOVERY FROM CLOCK SIGNAL LOSS

(75) Inventor: Bin Guo, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/247,334

(22) Filed: Feb. 10, 1999

Related U.S. Application Data

(60) Provisional application No. 60/082,183, filed on Apr. 17, 1998.

(51) Int. Cl.[7] .......................... G06F 11/00; G01R 31/28
(52) U.S. Cl. ............................................. 714/55; 327/20
(58) Field of Search ................. 714/55, 48, 2, 714/18, 25, 30, 37, 39, 43; 327/20, 198, 340, 142, 149

(56) References Cited

U.S. PATENT DOCUMENTS

| | | | |
|---|---|---|---|
| 4,628,519 A | * 12/1986 | Najafi | 375/361 |
| 5,138,636 A | * 8/1992 | Bardin | 375/357 |
| 5,264,745 A | 11/1993 | Woo | 307/475 |
| 5,349,612 A | 9/1994 | Guo et al. | 375/118 |
| 5,367,542 A | 11/1994 | Guo | 375/110 |
| 5,400,370 A | 3/1995 | Guo | 375/118 |
| 5,451,894 A | 9/1995 | Guo | 327/241 |
| 5,457,719 A | 10/1995 | Guo et al. | 375/373 |
| 5,642,069 A | * 6/1997 | Waite | 327/292 |
| 5,933,458 A | * 8/1999 | Leurent et al. | 375/317 |
| 6,222,392 B1 | * 4/2001 | Guo et al. | 327/20 |
| 6,242,954 B1 | * 6/2001 | Taniguchi et al. | 327/149 |

* cited by examiner

*Primary Examiner*—Nadeem Iqbal

(57) ABSTRACT

An apparatus and method are disclosed for initiating automatic recovery from a signal loss. A frequency division circuit receives a system clock signal, and generates an output signal having a lower frequency than the clock signal. An input detection circuit receives an asynchronous input signal from an external source and outputs a third output signal that indicates whether or not the asynchronous input signal is present or absent within a prescribed detection interval. A recovery circuit receives the system clock signal and the third output signal, and outputs a recovery signal that indicates a loss of the asynchronous input signal over a predetermined length of time. The recovery signal is used as a trigger to initiate a recovery process by the system.

15 Claims, 3 Drawing Sheets

AUTOMATIC RECOVERY FROM CLOCK SIGNAL LOSS

CROSS-REFERENCE TO RELATED APPLICATIONS

This application claims priority from provisional patent application Ser. No. 60/082,183, filed Apr. 17, 1998.

BACKGROUND OF THE INVENTION

1. Field of the Invention

The present invention relates to clock/data recovery systems and more particularly to an apparatus and method for applying digital techniques to initiate a recovery process upon detecting the loss of a signal.

2. Description of the Related Art

Data transmission systems sometimes incorporate accurate and stable delay elements to generate predetermined width pulses, clock synchronization, clock multiplication, and clock/data recovery. In systems that serially transmit and receive data, clock information is generally embedded in the data stream to provide correct timing for data recovery, because there are no separate lines or channels to independently carry the clock signal to the receiver. Clock frequency recovery and phase alignment with the data are typically performed before the received data can be recovered and deserialized.

Traditionally, a Phase Locked Loop (PLL) circuit is employed to recover the clock frequency and align the data with the clock phase. A PLL circuit is a type of circuit that incorporates a Voltage Controlled Oscillator (VCO) whose frequency is continuously adjusted in response to the frequency of the incoming data. Modern data communication systems generally transmit and receive data in digital form, and accordingly implement the PLL in a digital form. Various examples of these systems are disclosed in U.S. Pat. No. 5,457,719; 5,349,612; 5,400,370; 5,367,542; 5,451,894; and 5,264,745. Digital PPL circuits typically employ an adjustable bias voltage, or current, to adjust the delay value of a delay unit in a ring oscillator in order to achieve frequency tuning (or to adjust the phase to match that) of the incoming data. Digital PLL circuits use digital logic for phase detection, filtering, and (at times) the ring oscillator. However, such techniques must be specifically designed to accommodate particular data or coding formats, jitter tolerance, or operational frequencies.

In purely digital approaches to clock and data recovery, the phase offset information is stored in a digital format as a code. The code is stored and constantly updated in specially designed register circuits in order to reflect the phase difference as a function of time. In practice however, the incoming serial data is often contaminated with various types of noises that result in timing or phase jitter. Consequently, the edges (i.e., the transitions) in the data stream do not always arrive at precisely the same time. Rather, the edges arrive at a different (either early or late) times, causing the timing noises (i.e., jitter).

There are several drawbacks to the use of traditional PLL circuits for clock and data recovery. In analog PLL circuits, incorrect phase errors are detected due to excessive noise and adjustments are continually attempted even if the VCO frequency is at the same as, or very close to, the data frequency. PLLs can be designed to reduce the effect of jitter sources in the high frequency range by employing complex low pass filters. However, such filtering often introduces other problems. The control voltage to the VCO is very susceptible to internally generated switching noise, and such susceptibility increases as the operating frequency increases. Furthermore, low pass filters employ large valued components such as capacitors and resistors, hence resulting in increased manufacturing costs when implemented as monolithic integrated circuits.

Digitally implemented PLL circuits tend to be less sensitive to noise than analog PLL circuits under very noisy power supply conditions. However, digital PLL circuits are often subject to a "lock up" condition. Under such lock up conditions, the system enters an undefined state wherein the stored information is either lost or "locked" and, consequently, unretrievable. This is because unlike analog PLL circuits, where there is always a stored bias voltage value (regardless of changes in the power supply voltage), a digital system is typically unable to recover from unwanted states resulting from a power surge unless a full or partial reset operation is performed.

Regardless of the technique implemented (i.e., digital or analog), the recovered clock signal is subsequently used as the receive system clock to get data out of a first-in first-out (FIFO) buffer, or similar type of queue. The host receiving the data stream is thus capable of retrieving the data in the buffer without losing any bits. However, when the clock signal is lost, the recovery process stops. In digital systems, such interruptions correspond to lock up conditions. When an interruption is detected, the host must reset the system, which in a communication network requires shutting down and restarting the link.

According to one approach to digital data recovery, various digital "pointers" are used to indicate the delay calibration status and the phase difference between the local clock and the remote clock which is used to send the data over the serial link. The pointers are constantly adjusted based on variations in temperature, supply voltage, and data phase and frequency. Compared to traditional synchronous digital circuits, these adjustment operations are further complicated by the fact that they relate to two asynchronous clock sources, with one being the local clock and the other being the clock recovered from the data. When a power supply surge occurs, there is a possibility that one of the "pointers" can get lost, and subsequently, the recovered clock signal gets lost. User software "watch dog" functions have previously been used for detecting such losses in order to ensure reliability and automatic recovery from unexpected events. However, in an integrated chip or system, software monitoring systems used by the user can only do a system-wide or chip-wide reset, hence requiring shutting down and restarting the link.

Accordingly, a primary disadvantage associated with current digital methods of recovering asynchronous signals, such as a clock signal, and data from a serially transmitted data stream is the inability to detect and automatically recover from a loss of the recovered clock signal.

DISCLOSURE OF THE INVENTION

There is a need for an arrangement for detecting a loss of asynchronous signals associated with serially transmitted data streams, and initiating a graceful recovery upon detecting the loss of the asynchronous signals.

These and other needs are addressed by the present invention, wherein an input signal that is asyncrhonous to the system clock, but very close in frequency, is monitored, and a reset signal synchronous to the system clock is generated to initiate a recovery process upon detecting the loss of the input signal.

In accordance with one aspect of the invention, an apparatus for initiating automatic recovery from a signal loss comprises a frequency division circuit, an input detection circuit, and a recovery circuit. The frequency division circuit receives a system clock signal, and outputs at least one output signal that has a lower frequency than the system clock signal. The input detection circuit receives an asynchronous input signal and outputs a first output signal. The first output signal indicates whether or not the asynchronous input signal is present or absent within a prescribed detection interval. In addition, the first output signal is asynchronous with the system clock signal. The recovery circuit receives the system clock signal and the first output signal, and outputs a recovery signal. The recovery signal indicates a loss of the asynchronous input signal over a predetermined length of time, and is used to initiate a recovery from the loss of the asynchronous signal. The present arrangement allows a local reset that is both graceful and synchronous with the system clock signal, and does not require shutting down and restarting the communication link. Additionally, the cost of such a reset is only the loss of a few data packets, which can easily be handled by upper-layer error control protocols.

According to another aspect of the invention, a method is provided for detecting the loss of an asynchronous input signal and initiating a recovery process. A system clock signal is received and a first output signal, that is asynchronous with the system clock signal, is generated to indicate the presence of the asynchronous input signal within a prescribed detection interval. A recovery signal is then generated based on the first output signal and the system clock signal to indicate a loss of the asynchronous input signal over a predetermined length of time. The recovery signal is also used to initiate recovery from the loss of the asynchronous input signal. According to the present method, a local reset that is both graceful and synchronous to the system clock can be initiated based on the recovery signal.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the sane reference numeral designations represent like elements throughout and wherein.

DETAILED DESCRIPTION OF THE PREFERRED EMBODIMENT

Figure 1:
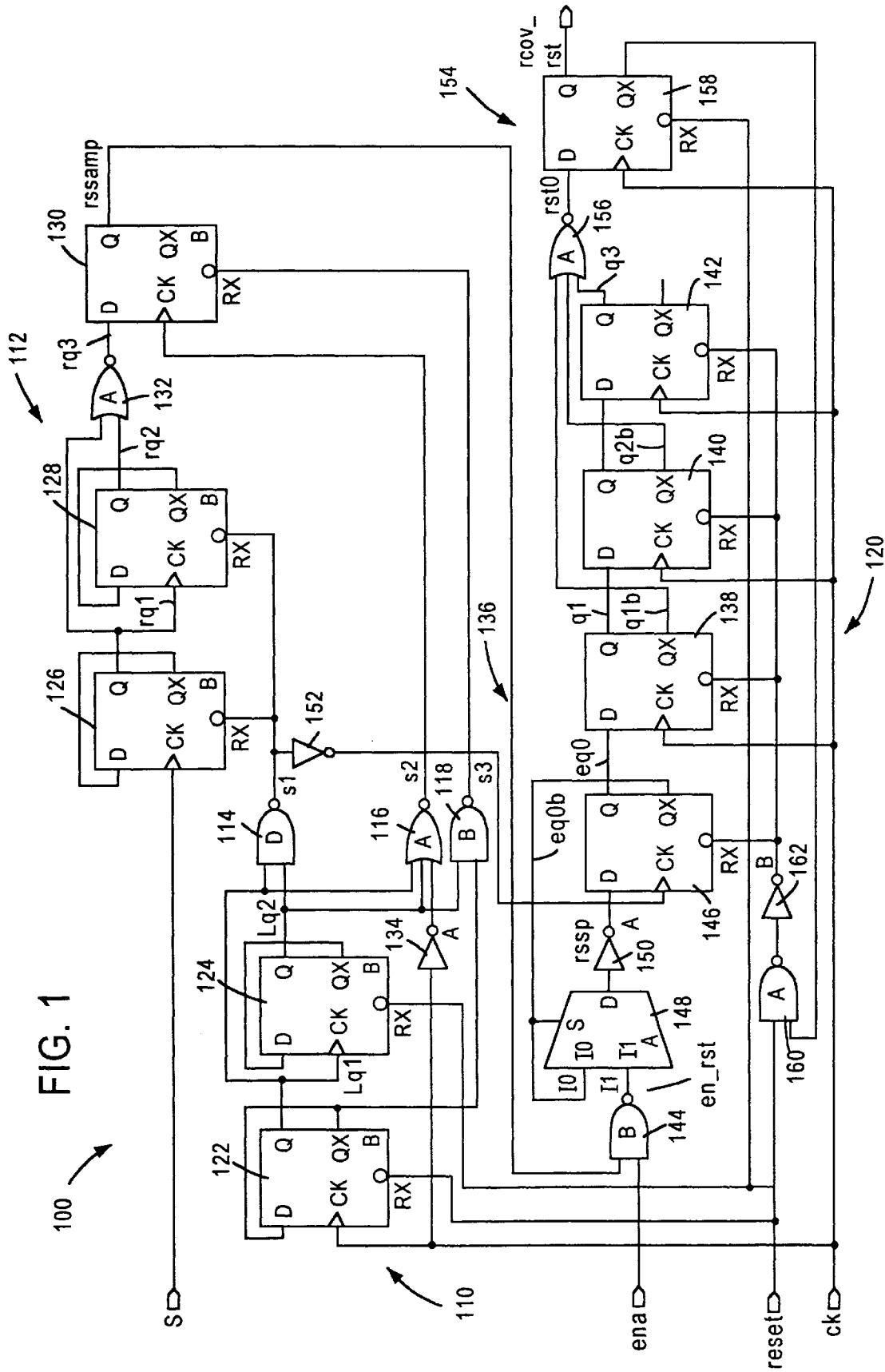
FIG. 1 is a schematic diagram illustrating an exemplary circuit for detecting signal loss and initiating a recovery process according to the present invention.

FIG. 1 is a schematic diagram illustrating an exemplary circuit 100 for initiating automatic recovery from a signal loss according to an embodiment of the present invention. The circuit 100 includes a frequency division circuit 110, an input detection circuit 112, a plurality of timing gates (114, 116, 118), and a recovery circuit 120. The frequency division circuit 110 includes a pair of D-type flip-flops (122, 124) with reset inputs. Flip-flop 122 is clocked by a system clock signal (CK) such as a locally generated clock, and outputs a first timing signal (LQ1) that has a frequency which is one half (½) the frequency of the system clock signal (CK). Flip-flop 122 also receives its inverted output in a feedback loop. The first timing signal (LQ1) is used to clock flip-flop 124. Flip-flop 124 outputs a second timing signal (LQ2) that has a frequency which is one half (½) the frequency of the first timing signal (LQ1), or one quarter (¼) of the system clock signal (CK). Flip-flop 124 also receives its inverted output in a feedback loop.

The input detection circuit 112 includes a pair of D-type flip-flops (126, 128) with reset inputs, a shift register 130, and a NOR gate 132. Flip-flop 126 is clocked by an input signal (S) that is received from an external source, and outputs a signal (RQ1) that is used to clock flip-flop 128. The inverted output of flip-flop 126 is fed back to itself. Similarly, flip-flop 128 receives its inverted output in a feedback loop and outputs signal RQ2. The outputs of both flip-flops 126 and 128 are input to NOR gate 132, which outputs a detection signal (RQ) based on predetermined bit patterns detected from the outputs of flip-flops 126 and 128. As described in further detail below, the detection signal (RQ) indicates the state of the input signal (S) within a prescribed detection interval. According to the disclosed embodiment, the prescribed detection interval is two system clock cycles.

As previously stated, the circuit 100 includes a plurality of timing gates, namely NAND gate 114, NOR gate 116, and NAND gate 118. These timing gates are used to generate proper timing signals for using the system clock signal (CK) to detect the input signal (S). By monitoring the timing between the system clock signal (CK) and the input signal (S), shift register 130 is capable of outputting a first output signal (RSSAMP) that is synchronous with the system clock signal (CK) and is an indication of the existence of the input signal (S). NAND gate 114 receives the first and second timing signals (LQ1, LQ2) from flip-flops 122 and 124, respectively. NAND gate 114 outputs a first control signal (S1) that is used to reset flip-flops 126 and 128. NOR gate 116 also receives the first and second timing signals (LQ1, LQ2). In addition, an inverted system clock signal is output from inverter 134 to NOR gate 116. NAND gate 118 receives the second timing signal (LQ2) and the inverted output from flip-flop 122 which is complementary to the first timing signal (LQ1).

The detection signal output by NOR gate 132 is input to flip-flop 130 which functions to synchronize the asynchronous input signal (S) with the system clock signal (CK). NOR gate 116 outputs a second control signal (S2) that is synchronized with the system clock signal (CK) and used to clock flip-flop 130. NAND gate 118 outputs a third control signal (S3) that is used to reset flip-flop 130. The first output signal (RSSAMP) output by flip-flop 130 indicates whether or not the input signal (S) is present or absent within a prescribed detection interval and is now synchronous to the system clock signal (CK). According to one embodiment of the invention, the prescribed detection interval is two system clock cycles. The detection interval is preferably selected such that at least one edge of the asynchronous input signal (S) is detectable if the frequencies of the asynchronous input signal (S) and the system clock signal (CK) are close enough.

The recovery circuit 120 includes an input gate (NAND gate 144), a self-storing register 136, a plurality of shift registers (138, 140, 142), an output circuit 154, and a reset gate (NAND gate 160). NAND gate 144 receives the first output signal (RSSAMP) from flip-flop 130 and an enable signal (ENA) that functions to ensure that initial start period is by-passed and a stable input signal is provided to prevent system activities that may be misinterpreted as a loss of the input signal (S). NAND gate 144 outputs a second output signal (EN_RST) to the self-storing register 136, which in turn outputs a third output signal (EQØ).

The self-storing register 136 includes a D-type flip-flop 146 having a reset input, and a multiplexer 148. The multiplexer 148 receives the second output signal (EN_RST) from NAND gate 144 as input I1 and an inverted third output signal (EQØb) as input I0, and selectively outputs a fourth output signal. The fourth output signal is passed through inverter 150 and input to flip-flop 146. The first control signal (S1) from NAND gate 114 is passed through inverter 152 so that the falling edge of the first control signal (S1) is used to clock flip-flop 146, which subsequently outputs the third output signal (EQØ). Flip-flop 146 also outputs the inverted third output signal (EQØb) that is input to multiplexer 148. Additionally, the inverted third output signal (EQØb) is used to control the input selection of multiplexer 148.

The third output signal (EQØ) is sequentially input to the plurality of shift registers (138, 140, 142). Specifically, shift register 138 receives the third output signal (EQØ) from flip-flop 146, and generates an output signal (Q1) that is input to shift register 140. Shift register 140, in turn, generates an output signal (Q2) that is input to shift register 142. Shift registers 138, 140, and 142 are all clocked by the system clock signal (CK).

The output circuit 154 includes a NOR gate 156 and a flip-flop 158. The inverted outputs of shift registers 138 and 140 (Q1b, Q2b), and the output of shift register 142 (Q3) are output as a parallel bit pattern to NOR gate 156. NOR gate 156 detects a predetermined bit pattern from shift registers 138, 140, and 142, and outputs a reset signal (RSTO) to flip-flop 158. The system clock signal (CK) is used to clock flip-flop 158, thereby allowing flip-flop 158 to output a recovery reset signal (RCOV_RST) that is synchronous with the system clock signal (CK). The recovery reset signal (RCOV_RST) is output to a recovery/reset circuit (not shown) responsible for performing the actual recovery from the input signal loss.

Flip-flop 158 also outputs an inverted recovery reset signal that is input to a reset gate (NAND gate 160). NAND gate 160 also receives a system reset signal (RESET) from an external circuit (not shown). NAND gate 160 outputs a fourth control signal that is passed through inverter 162 and used to reset flip-flop 146 and shift registers 138, 140, and 142. Detection of the predetermined bit pattern from shift registers 138, 140, and 142 can be initiated either by system reset or by recover reset.

In operation, the circuit 100 continually monitors the asynchronous input signal (S), and based on the control signals generated by timing gates 114, 116, and 118 (S1, S2, and S3), flip-flop 130 generates the first output signal (RSSAMP) synchronous to the system clock signal (CK). When the circuit 100 is initially activated, all components are reset and shift registers 138, 140, and 142 output the values [0 0 0]. However, NOR gate 156 receives the values [110] from shift registers 138, 140, and 142, respectively. Under normal conditions, flip-flop 146 will maintain a latched state of 0 value after reset. Hence, in order to trigger NOR gate 156, flip-flop 146 must output two consecutive 1s to thereby cause shift registers 138 and 140 to latch a value of 1. Once this occurs, NOR gate 156 will receive a value of [0 0 0], and output the reset signal (RSTØ).

Figure 2:
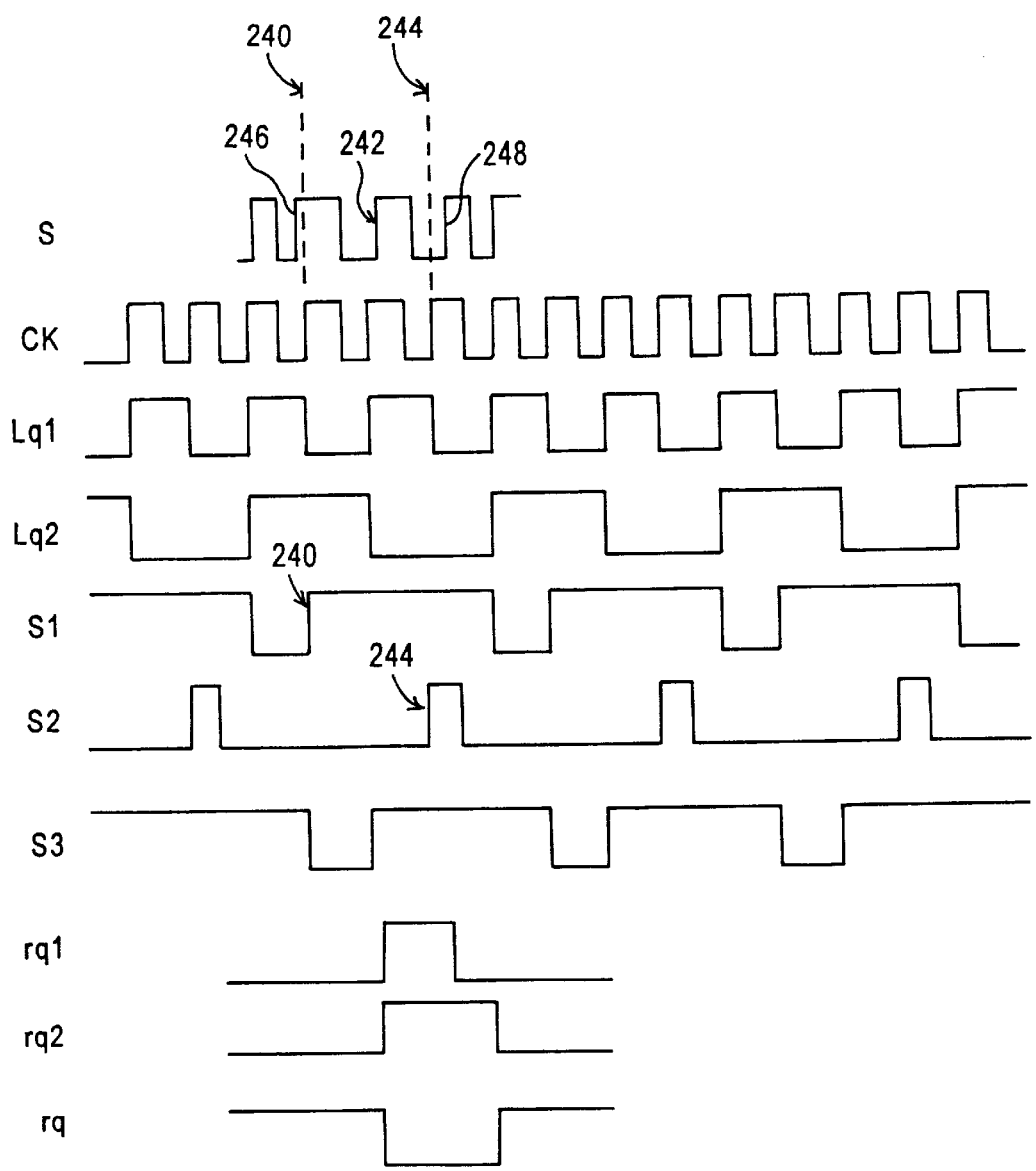
FIG. 2 is a timing diagram illustrating the timing relationships between the various signals generated by the circuit of FIG. 1.

Referring additionally to FIG. 2, a timing diagram is illustrated to indicate the timing relationships between the various signals generated by the circuit 100 illustrated in FIG. 1. Flip-flop 122 outputs the first timing signal (LQ1) at a frequency which is one half (½) that of the system clock signal (CK). Flip-flop 124 outputs the second timing signal (LQ2) at a frequency which is one half (½) that of the first timing signal (LQ1). NAND gate 114 outputs the first control signal (S1) to reset flip-flops 126 and 128. When the first control signal (S1) is deasserted, flip-flops 126 and 128 are held in the reset state, and their respective outputs (RQ1 and RQ2) are held in a deasserted state. In this state, flip-flops 126 and 128 are prevented from responding to the input signal (S). When the first control signal (S1) is asserted at event 240, flip-flops 126 and 128 begin to respond to the input signal (S), at event 242, RQ1 and RQ2 are asserted by the clocking edge of the input signal (S).

In response to the outputs of either flip-flops 126 and 128 (RQ1 and RQ2) being asserted, NOR gate 132 deasserts the detection signal (RQ). Two system clock (CK) cycles after the first control signal (S1) is asserted (event 244), NOR gate 116 outputs the second control signal (S2). This corresponds to a condition where the inputs of NOR gate 116, namely the first timing signal (LQ1), the second timing signal (LQ2), and the inverted clock signal (#CK, not shown), are respectively [0 0 0]. When the second control signal (S2) is asserted at event 244, flip-flop 130 will latch the value of the detection signal (RQ) output by NOR gate 132.

The system clock signal (CK) and the input signal (S) will typically be close in frequency, but with a varying phase difference. Nonetheless, regardless of how much the input signal (S) is distorted in the duty cycle, at least one rising edge (e.g., event 242) of the input signal (S) will be detected within any two clock cycles, e.g., between assertion of the first and second control signals (S1 and S2) at events 240 and 244. As illustrated in FIG. 2, the prescribed detection interval is two system clock cycles as defined by events 240 and 244. If, for example, there is substantial timing noise or jitter, and a rising edge of the input signal (S) is early (event 246), or late (event 248), relative to the system clock (CK) and can not change the state of flip-flop 126 within the detection period, at least one rising edge (event 242) will be detected. Hence, the states of flip-flops 126 and 128 will be changed and it is said an edge or signal activity is detected. Under most conditions however, two edges of the input signal (S) will be detected.

Depending on the number of rising edges detected in the input signal (S), the values output by flip-flops 126 and 128 could be either [1 1], [0 1], or [1 0]. Any value of 1 that is output by flip-flop 126 or 128 is indicative of the presence of the input signal (S). If the input signal (S) is present, NOR gate 132 will output the detection signal (RQ) equal to 0. Therefore, if the input signal (S) is present and at least one rising edge thereof is detected, then flip-flop 130 will keep the first output signal (RSSAMP) deasserted. According to one embodiment of the present invention, the length of the prescribed detection interval may be increased if flip-flop 130 is negative edge triggered.

As long as the first output signal (RSSAMP) generated remains deasserted (i.e., equal to 0), NAND gate 144 will assert its output signal (EN_RST). After initial reset, flip-flop 146 latches a value of 0. Since the inverted output of flip-flop 146 (EQØb) is used as the select input of multiplexer 148, the output of multiplexer 148 will be whatever value is present at input I1 (i.e., EN_RST from NAND gate 144). The output of multiplexer 148 is inverted by flip-flop 150 and flip-flop 146 latches a value of 0. As long as the first output signal (RSSAMP) remains deasserted to indicate the presence of the input signal (S), flip-flop 146 will output a 0 which is continuously shifted into the shift register. Hence, NOR gate 156 will not detect a bit pattern of [0 0 0] (until EN_RST=0) and no recovery signal (RCOV_RST) will be output by flip-flop 158.

Figure 3:
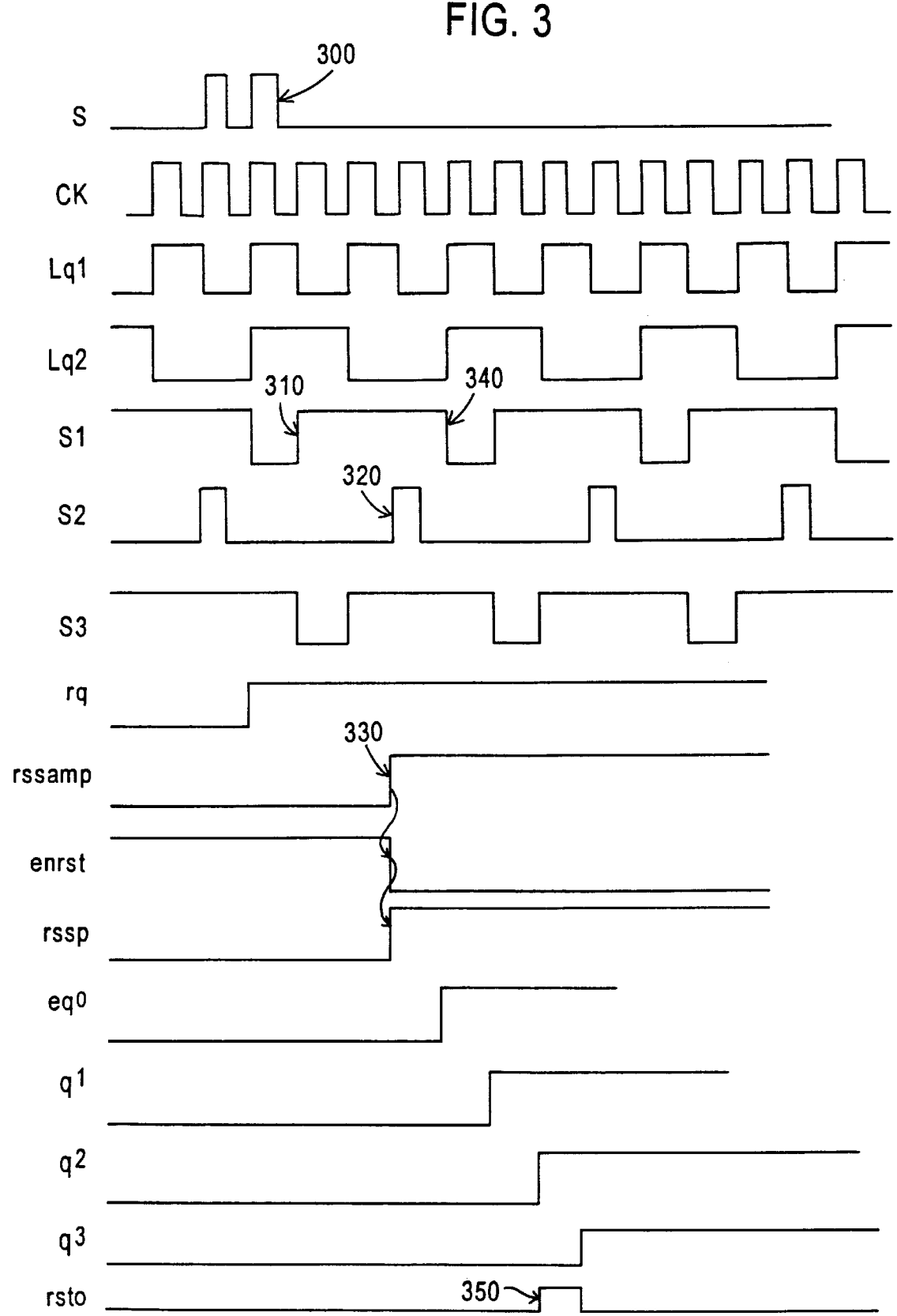
FIG. 3 is a timing diagram illustrating initiation of the recovery process.

FIG. 3 is a timing diagram illustrating detection of a loss of the input signal (S). At event 300, the input signal (S) is lost and a value of 0 is continuously received. The detection interval begins at event 310, where NAND gate 114 asserts the first control signal (S1), and ends at event 320, where NOR gate 116 asserts the second control signal (S2). As previously described with respect to FIG. 2, assertion of the first control signal (S1) allows flip-flops 126 and 128 to latch the values of the input signal (S). However, the input signal (S) is not detected within the prescribed detection interval, and flip-flops 126 and 128 both latch a value of 0 (i.e., RQ1 and RQ2 are both deasserted). Hence, the detection signal (RQ) output by NOR gate 132 has a value of 1 (i.e., asserted). When NAND gate 118 deasserts the third control signal (S3), flip-flop 130 will latch the value of the detection signal (RQ) received from NOR gate 132, and assert the first output signal (RSSAMP) at the rising edge of the system clock signal (CK), i.e., event 330.

In response to the first output signal RSSAMP (and the enable signal ENA) being asserted at event 330, NAND gate 144 deasserts the second output signal (EN_RST). In response to deassertion of the second output signal (EN_RST), multiplexer 148 outputs a value of 0, which is changed to a value of 1 by inverter 150 (i.e., RSSP becomes asserted) and input to flip-flop 146. At the falling edge of the first control signal (S1), i.e., event 340, inverter 152 will output a positive edge and cause flip-flop 146 to latch the asserted signal from inverter 150 (RSSP). Flip-flop 146 will output a signal (EQ0) having a value of 1 that will be propagated to shift register 138 and 140 during the following two system clock cycles (i.e., EQ1 and EQ2 will become asserted). When the output signals from shift registers 138 and 140 (EQ1 and EQ2) are both asserted, NOR gate 156 will receive the values [0 0 0] from shift registers 138, 140, and 142, respectively. Accordingly, NOR gate 156 will assert the reset signal (RST0) at event 350. At the rising edge of the following system clock cycle, flip-flop 158 will latch the value of the reset signal (RST0) and assert the recovery signal (RCOV_RST), not shown). The recovery signal (RCOV_RST)) is thus output as a trigger to the recovery/reset circuit (not shown), which is used to execute a recovery reset function and synchronize the reset with the system clock signal.

The present arrangement advantageously allows digital systems to automatically detect the loss of an asynchronous input signal and generate a recovery signal. The circuit continually monitors the asynchronous input signal in order to detect a loss thereof within a prescribed detection interval. Control signals that are derived from the system clock signal are used to ensure that an output signal, indicative of the loss of the asynchronous input signal, is generated synchronous to the system clock signal. Circuitry is also provided verify the loss of the asynchronous input signal over a predetermined length of time prior to generating the recovery signal, hence minimizing unnecessary resets that result from temporary signal loss or noise. One advantage of such a system is that it detects and corrects where there is a loss of the input signal, without requiring a system level reset. Therefore, a local reset that is graceful and does not require shutting down and restarting the communication link can be performed. Additionally, the cost of such a reset is only the loss of one or a few data packets, which can be tolerated by implementing error control protocols.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. Apparatus for initiating automatic recovery from a signal loss comprising:
   a frequency division circuit for receiving a system clock signal and outputting at least one output signal having a lower frequency than said system clock signal;
   an input detection circuit for receiving an asynchronous input signal, and outputting a first output signal indicative of the absence of said asynchronous input signal within a prescribed detection interval, said first output signal being synchronous with said system clock signal; and
   a recovery circuit for receiving said system clock signal and said first output signal and generating a recovery signal indicative of a loss of said asynchronous input signal over a predetermined length of time, said recovery signal initiating recovery from the loss of said asynchronous input signal.

2. The apparatus of claim 1, wherein said frequency division circuit includes:
   a first flip-flop for generating a first timing signal having a lower frequency than said
   system clock signal; and
   a second flip-flop for receiving said first timing signal and generating a second timing signal having a lower frequency than said first timing signal.

3. The apparatus of claim 1, further comprising a timing circuit for receiving said at least one output signal and said system clock signal, and outputting a plurality of control signals for controlling said input detection circuit and synchronizing the timing of said first output signal with said system clock signal.

4. The apparatus of claim 1, wherein said input detection circuit includes:
   a plurality of flip-flops for generating bit patterns in response to said asynchronous input signal;
   a logic gate for outputting a detection signal, based on a predetermined bit pattern in the bit patterns from said plurality of flip-flops, said detection signal being indicative of presence of said asynchronous input signal within said prescribed detection interval; and
   a shift register for outputting said first output signal based on said detection signal.

5. The apparatus of claim 4, further comprising a timing circuit for outputting a plurality of control signals for controlling said input detection circuit and synchronizing the timing of said first output signal with said system clock signal based on said first timing signal and said second timing signal.

6. The apparatus of claim 5, wherein said timing circuit includes:
   a first logic gate for outputting a first control signal for resetting said plurality of flip-flops based on said first and second timing signals;

a second logic gate for outputting a second control signal for clocking said shift register based on said first and second timing signals and an inverted system clock signal; and a third logic gate for outputting a third control signal for resetting said shift register based on an inverted first timing signal and said second timing signal.

7. The apparatus of claim 1, wherein said recovery circuit includes:

an input gate for outputting a second output signal based on predetermined bit patterns from at least said first output signal;

a self-storing register for receiving said second output signal and an inverted first control signal, and selectively outputting a third output signal indicative of the presence of said asynchronous signal;

a plurality of shift registers for generating a bit pattern in response to said third output signal;

an output circuit for detecting a predetermined bit pattern from said plurality of shift registers, and in response, outputting said recovery signal and an inverted recovery signal; and a reset gate for outputting a fourth control signal for resetting said self-storing register and said plurality of shift registers based on a system reset signal and an inverted recovery signal.

8. The apparatus of claim 7, wherein said self-storing register includes:

a multiplexer for receiving said second output signal and an inverted third output signal, and selectively outputting a fourth output signal;

an inverter for receiving said fourth output signal and outputting an inverted fourth output signal; and a flip-flop for receiving said fourth output signal and said inverted first control signal, and outputting said third output signal, said inverted first control signal being used to clock said flip-flop.

9. The apparatus of claim 8, wherein said inverted third output signal is used to control said multiplexer.

10. A method of detecting the loss of an asynchronous input signal and initiating a recovery process, the method comprising the steps:

generating a first output signal indicative of the presence of said input signal within a prescribed detection interval, said first output signal being synchronous with said system clock signal; and generating a recovery signal based on said first output signal and said system clock signal, said recovery signal being indicative of a loss of said input signal over a predetermined length of time.

11. The method of claim 10, further comprising the steps:

generating a first timing signal based on said system clock signal, said first timing signal having a lower frequency than said system clock signal; and generating a second timing signal based on said first timing signal, said second timing signal having a lower frequency than said first timing signal.

12. The method of claim 11, further comprising a step of generating a plurality of control signals, based on said first and second timing signals, for controlling the step of generating a first output signal.

13. The method of claim 12, wherein the step of generating a first output signal further includes the steps:

sequentially shifting detected values of said input signal through a plurality of flip flops;

detecting a prescribed bit pattern output from said plurality of flip-flops; and generating said first output signal based on the detection of the prescribed bit pattern.

14. The method of claim 13, wherein the step of generating a plurality of control signals further includes the steps:

generating a first control signal, based on said first and second timing signals, for resetting said plurality of flip-flops;.

generating a second control signal, based on said first and second timing signals and an inverted system clock signal, for clocking a shift register used to generate the first output signal; and generating a third control signal, based on an inverted first timing signal and said second timing output signal, for resetting said shift register.

15. The method of claim 10, wherein the step of generating a recovery signal further includes the steps:

sequentially shifting a value corresponding to said first output signal through a plurality of shift registers;

detecting a predetermined bit pattern from said plurality of shift registers, said predetermined bit pattern being indicative of a loss of said input signal; and generating said recovery signal based upon detection of said predetermined bit pattern.

* * * * *